United States Patent
Nöffke et al.

(10) Patent No.: US 11,224,160 B2
(45) Date of Patent: *Jan. 18, 2022

(54) ADAPTIVE TECHNOLOGIES FOR VETIVER GRASS PROPAGATION AND TRANSPLANTATION AND RELATED METHODS OF REPURPOSING VETIVER GRASS

(71) Applicant: Environmental Bio Solutions, Inc., Summerville, SC (US)

(72) Inventors: Roland Eduard Nöffke, Midrand (ZA); Bruce Edward Coy, Summerville, SC (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/395,511

(22) Filed: Apr. 26, 2019

(65) Prior Publication Data

US 2019/0246554 A1    Aug. 15, 2019

Related U.S. Application Data

(63) Continuation of application No. 15/586,900, filed on May 4, 2017, now Pat. No. 10,314,225.

(60) Provisional application No. 62/333,384, filed on May 9, 2016.

(51) Int. Cl.
| | |
|---|---|
| *A01C 14/00* | (2006.01) |
| *A01C 21/00* | (2006.01) |
| *E02D 17/20* | (2006.01) |
| *A01D 34/04* | (2006.01) |

(52) U.S. Cl.
CPC .............. *A01C 14/00* (2013.01); *A01C 21/00* (2013.01); *A01D 34/043* (2013.01); *E02D 17/20* (2013.01)

(58) Field of Classification Search
CPC ...... A01C 14/00; A01C 21/00; A01D 34/043; A01D 34/04; A01D 34/03; A01D 34/02; A01D 34/01; A01D 34/00; E02D 17/20; E02D 17/00
See application file for complete search history.

(56) References Cited

U.S. PATENT DOCUMENTS

| | | | | |
|---|---|---|---|---|
| 10,314,225 | B2 * | 6/2019 | Nöffke | A01C 21/00 |
| 2004/0250702 | A1 * | 12/2004 | McHale | A01F 15/071 |
| | | | | 100/87 |
| 2010/0300368 | A1 * | 12/2010 | Myers | C10L 5/146 |
| | | | | 119/171 |
| 2015/0132060 | A1 | 5/2015 | Stehling | |
| 2015/0344338 | A1 | 12/2015 | Granley | |

FOREIGN PATENT DOCUMENTS

SU       1050595 A   * 10/1983   ............. A01C 11/02

* cited by examiner

*Primary Examiner* — Christopher J. Novosad
(74) *Attorney, Agent, or Firm* — The Roy Gross Law Firm, LLC; Roy Gross (57) ABSTRACT

The present invention relates to method of implementing an ecologically sustainable and economically practical Vetiver plantation, which provides for reduced cost and time for propagating, transplanting and harvesting of Vetiver Grass by mechanical and/or automatic means. Primary and secondary application benefits, as well as cold tolerant Vetiver grass plant are described herein.

14 Claims, 5 Drawing Sheets

ADAPTIVE TECHNOLOGIES FOR VETIVER GRASS PROPAGATION AND TRANSPLANTATION AND RELATED METHODS OF REPURPOSING VETIVER GRASS

RELATED APPLICATIONS

This application claims the benefit of priority of U.S. patent application Ser. No. 15/586,900 filed on May 4, 2017, which claims priority to U.S. Provisional Patent Application No. 62/333,384 filed on May 9, 2016. The contents of the above applications are all incorporated by reference as if fully set forth herein in their entirety.

BACKGROUND OF THE DISCLOSURE

Chrysopogon Zizanioides is a non-invasive clump grass native to southern India and can be found in most countries around the world. It is also known as Sunshine Grass and, more commonly, as Vetiver Grass.

When fully grown, Vetiver Grass has a root system that grows mostly in a downward direction for several meters, which has significant structural properties. This makes Vetiver Grass useful as a biological erosion control solution, protecting soils from wind, water and other dynamic erosive agents. Moreover, its dense above-ground clumps create a hedge barrier that prohibits runoff sediment from entering watersheds and riparian areas. Still further, roots and leaves of Vetiver Grass exhibit a phytoremediation property whereby the Vetiver Grass absorbs significant amounts of nitrates, phosphates, heavy metals and other contaminates out of water and soils. Vetiver Grass has even been shown to reduce biological contaminates such as *e-coli*. Because of its many beneficial properties, Vetiver Grass, therefore, has been used worldwide as a biological environmental solution for erosion and contamination mitigation and remediation.

A further advantage of Vetiver Grass is its high cellulosic content, which includes a significant percentage of fermentable sugars. Vetiver Grass also has a high xylan content, when extracted and processed, becomes Xylitol which is a natural sugar substitute for diabetics.

With its decades-long lifespan and rapid regeneration cycles, Vetiver Grass may be an ideal biomass for energy production. Its ability to inhibit parasite growth in livestock has been established, but only utilized in the early growth stages of the plant, prior to the development of thick, sharp ridges on the leaf making it difficult for livestock to consume.

Unfortunately, Vetiver Grass is non-invasive and does not propagate by seeds. Therefore, Vetiver Grass is cultivated by manually harvesting and dissecting existing plants into single or multiple stems known as "slips" or "shoots." The stems are cut out between the roots and the leaf then typically planted by hand. These manual processes are sometimes augmented by simple tools such as a shovel and a machete, common hand tools, or even a farm tractor. However, the manual process of harvesting and preparing Vetiver stems for transplantation is time consuming and labor intensive. Likewise, the process of manually or mechanically assisted planting is time consuming and labor intensive.

Vetiver Grass for use as a biological solution for such things as erosion control and water contamination mitigation and remediation has been limited to impoverished countries where the indigenous low cost of labor for the manual propagation and transplantation of Vetiver Grass is conducive to implementation. Specifically, lack of funding, expertise and resources in impoverished countries inhibit utilization of modern, more expensive, institutional-level mechanical and chemical mitigation and remediation techniques, such as water treatment facilities and mechanical erosion control structures, as typically found in well-developed industrialized nations. On the other hand, adequate funding, skills and other resources in well-developed, industrialized nations like the United States has driven environmental solutions toward more expensive, institutional-level, mechanical and chemical mitigation and remediation techniques. Also, unlike impoverished nations, more industrialized countries have a tendency toward technology and away from the high cost of manual labor, and there has been little incentive for those countries to develop efficient utilizations of biological environmental solutions like Vetiver Grass.

What are needed in the industry are systems and methods that reduce or recoup the long term investment costs of planting, cultivating and harvesting Vetiver Grass.

BRIEF SUMMARY OF THE DISCLOSURE

According to the present disclosure, the inventors have discovered that Vetiver Grass—as a non-invasive, non-food crop and a sustainable and renewable feed stock—can generate large-scale, end-use economies from energy-based (biomass) and commercially-derived applications (xylan, essential oils, and the like) and from its many proven agricultural (e.g., anti-parasitic medicament for livestock) and environmental mitigation/remediation applications (e.g., erosion control and phyto-remediation).

The present disclosure is directed in general to new technologies and techniques that reduce cost and time for propagation, transplantation and harvesting of Vetiver Grass for multiple applications. The inventors have discovered specially designed tools, equipment, systems and processes to propagate, transplant and harvest Vetiver Grass that will promote the rapid implementation of sustainable, large-scale Vetiver plantations in wealthy and impoverished countries alike.

In the detailed description that follows various terms and acronyms are used, including the following:

Vetiver clump or mother plant material from which slips or tillers are split to yield material for immediate planting or for propagating into polybags.

The crown (corm) is the base (the hard part of the plant between the shoots and the roots) of a mature vetiver plant from which new shoots sprout.

A culm is the stem or stalk of a grass. The vetiver culm is solid, stiff, and hard; it has prominent nodes with lateral buds that can form roots and shoots when exposed to moist conditions.

Vetiver tillers or slips are sections of separated clump consisting of at least three or four well developed leaves.

Pandharinath More tractor drawn semi-automatic onion planter unit. Used to create planting furrows for fertilizer applications and for planting of vetiver slips or tillers.

Unit assembly generally having a wheeled frame with furrow openers, a fertilizer box and conveying tubes, trays for holding slips or tillers, chutes to deliver the slips or tillers, and multiple seating for a planting team.

The foregoing definitions are not intended to limit the scope of the present disclosure, but rather are intended to clarify terms that are well understood by persons having ordinary skill in the art. It should be appreciated that the defined terms may also have other meanings to such persons having ordinary skill in the art. These and other terms are used in the detailed description below.

According to one embodiment of the present disclosure, a method for implementing an ecologically sustainable, economically practical Vetiver plantation for multiple applications of Vetiver crops may include selecting a geographic area based on one of mitigation need, estimated crop yield, and multiple applications based on estimated crop yield; efficient transplantation of Vetiver grass to the geographic area to yield a Vetiver grass crop; providing a first benefit from a first application of mitigating water run-off or soil erosion with the Vetiver grass; and harvesting portions of the Vetiver Grass crop to provide a second benefit selected from the second application group consisting of an animal medicament, a consumable, a biofuel and combinations thereof. According to this method, tops of Vetiver Grass are trimmed and/or roots of Vetiver Grass are trimmed. Further, stalks of Vetiver Grass may be separated into shoots. The stalks or the shoots may be placed into containers for shipping or into segmented pallets for planting. The method may include automatically cutting stems from between roots and leaves of the Vetiver Grass.

Shoots may be mechanically planted, and the method may include forming holes in soil for the shoots, and the holes may be formed from a punch, a wheel, and/or an auger. The soil may be automatically compressed around each shoot, and each may be automatically fertilized.

In another embodiment, a method for efficiently implementing, sustaining, and propagating Vetiver grass plantations for multiple applications may include selecting a planting area based on predetermined criteria; transplanting Vetiver shoots to the planting area to yield a Vetiver grass crop; providing a primary application of the Vetiver grass crop; and providing a secondary application of the Vetiver grass crop subsidized by the primary application. The selection criteria may include mitigation needs, water purification needs, estimated crop yields, and potential multiple applications based on the estimated crop yields. The primary application may be mitigating water run-off, water purification, and/or prevention of soil erosion. The secondary application may be an animal medicament, a consumable, and/or a biofuel.

In yet another aspect of the disclosure, an ecologically sustainable, economically practical, cold tolerant Vetiver grass plant may be provided that has been genetically modified to be cold tolerant for use in colder climates, such as the northern states of the United States.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE DISCLOSURE

In general, the present disclosure is directed to systems and methods to promote and enable widespread use and applications of Vetiver Grass ranging from erosion mitigation to medicinal uses. Because Vetiver Grass is non-invasive and does not propagate by seeds, the present disclosure cultivates, harvests, and dissects existing plants into single or multiple stems known as "slips" or "shoots" using inventive automated methods and machinery. For instance, the stems are automatically cut from between roots and leaves of the grass, and planted by machinery faster, on a larger scale and at less cost than manual labor in rich countries, particularly when the leveraged, multi-use benefits are taken into account. Therefore, richer nations will be enticed to use the presently disclosed methods and devices for biologically friendly Vetiver Grass and to forego the expensive artificial techniques often used for soil erosion prevention and run-off mitigation and remediation.

In the description that follows, the multiple-use, multiple-benefit applications of Vetiver Grass have been unexpectedly discovered and are described in detail. For instance, an application that provides resources and justification to incur the relatively high initial investment in planting Vetiver Grass is leveraged to provide additional applications of the Vetiver Grass that offer recurring environmental benefits and/or economic benefits that would have been otherwise impractical to obtain. For example, a relatively large Vetiver Grass field can be planted primarily for waste water mitigation on a farm according to an aspect of the disclosure. The Vetiver Grass plantation is sufficiently large that it can be harvested to provide biomass for energy or medicaments for livestock herds, which a smaller, hand-planted Vetiver Grass crop in an isolated region cannot provide.

Detailed reference will now be made to the drawings in which examples embodying the present subject matter are shown. The detailed description uses numerical and letter designations to refer to features of the drawings. The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed descriptions are provided by way of explanation only and are not meant as limitations of the disclosure. The present subject matter thus includes any modifications and variations of the following examples as come within the scope of the appended claims and their equivalents.

Figure 1:
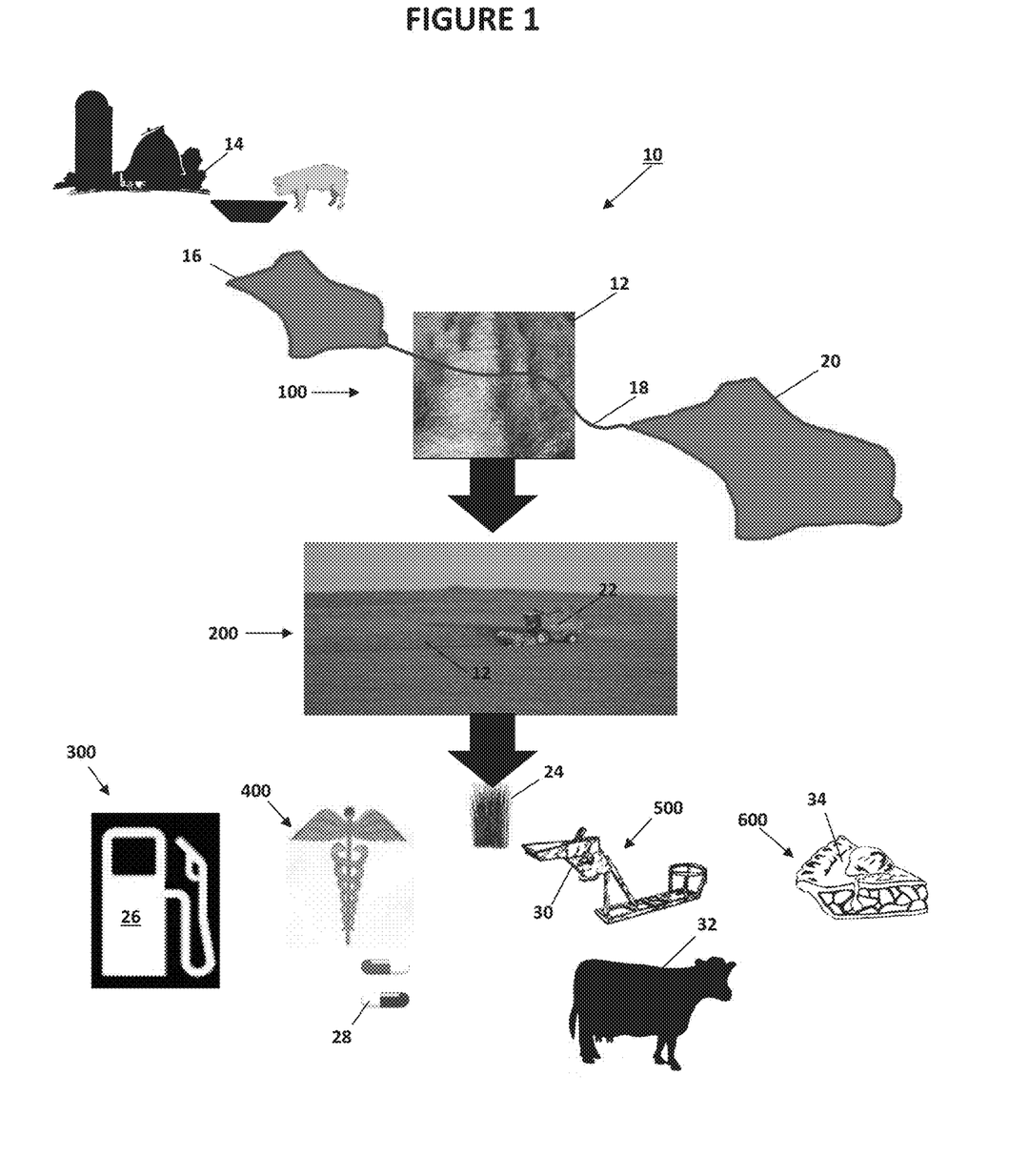
FIG. 1 is a diagram of showing an exemplary Vetiver Grass plantation and multiple applications and end-use economies according to an aspect of the disclosure.

Turning to FIG. 1, an automated, large scale Vetiver Grass production system is indicated in general by the number 10.

In this example, extensive rows of Vetiver Grass are labeled by element number 12 and are strategically planted between a pig farm 14 and its holding or waste pond 16 and a stream, river, or riparian area 18 and/or lake or other water source 20. Typically, a farmer will take waste water from the pond 16 to fertilize nearby crop fields. When it rains, however, the pond 16 may overflow. Without protection or some form of mitigation, runoff from the crop fields that have been fertilized with waste from the pond 16 may contaminate the waterways 18 and lakes 20. Here, however, the Vetiver Grass 12 acts as a barrier to inhibit runoff sediment from entering the bodies of water 18, 20. Moreover, the roots and leaves of the Vetiver Grass 12 act as filters of any run-off to absorb nitrates, phosphates, heavy metals and other contaminates from water and soil. The Vetiver Grass 12 can also reduce biological contaminants such as *e-coli*.

As shown in FIG. 1, according to the mass planting made possible by the present disclosure, the farmer can financially justify the plantation of multiple rows of the Vetiver Grass 12 as indicated by step 100 according to the automation and equipment of the disclosure. Thus, the farmer, employing a first application of the Vetiver Grass 12 crop, achieves a first, primary, or initial benefit in the form of environmental remediation from polluted runoff. Moreover, the farmer can harvest portions of the Vetiver Grass foliage 12 in step 200 using the inventive harvesting equipment 22 according to the disclosure, as described in additional detail below.

FIG. 1 further shows that the farmer may use or sell the harvested crop 24 as biomass for energy 26 in step 300. Additionally, or alternatively, the foliage 24 may be harvested for processing and use in medicinal applications according to step 400. For instance, the processed Vetiver Grass foliage 12 may be converted or used as an additive, mixture, or compound in medicines 28. Still further, the farmer may harvest the foliage 24 prior to development of thick, sharp leaf ridges and deposit the foliage 24, or harvest it at any time during its lifecycle and put it in a hammer mill 30 in step 500 where the processed Vetiver Grass foliage 12 can be fed to livestock 32. This new "harvest at any time" use of Vetiver Grass foliage 12 as a medicament to reduce parasites is an improvement over traditional, early stage use. In step 600, fermentables, essential oils, xylan and the like may also be extracted from the processed Vetiver Grass 12 to produce, for instance, sweeteners for foodstuffs or other consumables 34. The disclosure is not limited to these exemplary applications.

Figure 2:
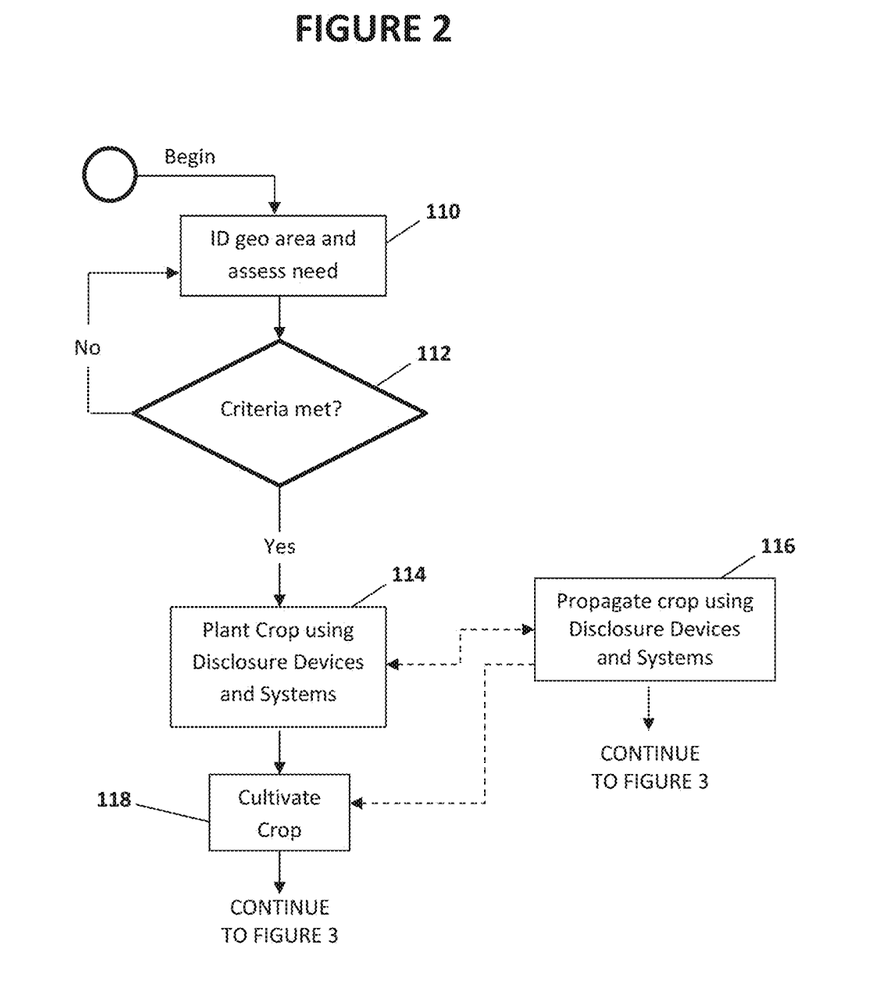
FIG. 2 is a flow chart of a Vetiver Grass process cycle depicting large-scale Vetiver Grass processes according to an aspect of the disclosure.

With reference now to FIG. 2, a user, such as a farmer, an agricultural business, a non-governmental entity (NGO), or a government agency like the United States Department of Agriculture (USDA), will identify a candidate geographic area in step 110. The assessed area may have erosion control needs or conditions but lack sufficient funding, expertise and resources to provide water treatment facilities and/or mitigation means. On the other hand, even an area in a relatively wealthy area or an industrialized nation with resources to employ institutional-level, mechanical and chemical mitigation techniques may be urged by public policy to employ environmental solutions described herein. If an area does not need large scale Vetiver Grass crops in step 112, attention can be turned to another candidate area for assessment.

As shown in FIG. 2, if an area is identified with an appropriate need or is simply a good candidate for a biological solution for erosion control, water contamination mitigation, and other uses for large-scale Vetiver Grass crops, a crop may be planted according to step 114. Because Vetiver Grass does not propagate by seeds, harvesting and dissecting plants into single or multiple stems is accomplished according to processes and methodologies designed herein to properly and efficiently extract and prepare Vetiver plants for propagation, including but not limited to: segregation and pruning of stems (slips or shoots) proper packaging, storage and transportation of stems; mechanical automation or semi-automation of planting stems at proper distances, depths, and compaction; and post-planting maintenance systems and processes. Additionally, the Vetiver Grass may be genetically modified to be cold-tolerant according to another aspect of the disclosure, and the genetically modified Vetiver Grass can be grown in northern climates, if that is the area identified in step 110. According to the present disclosure, specifically adapted, mechanized field harvesting equipment is provided to cut out stems between the roots and the leaf, plant and provide post-harvest storage, transportation and mechanical or chemical processing of the Vetiver Grass for its various non-propagation applications.

Figure 3:
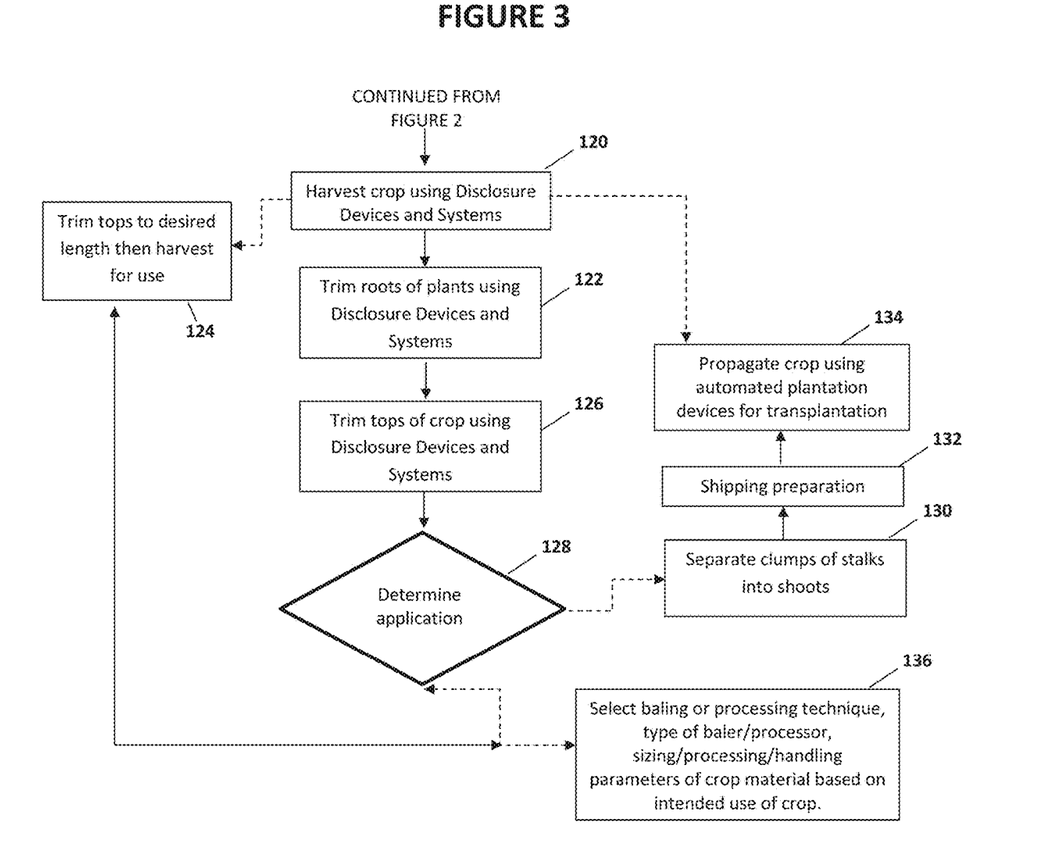
FIG. 3 is a continuation of the flow chart as in FIG. 2.

With reference to FIGS. 2 and 3, the Vetiver Grass crop may be cultivated in step 118 and/or propagated and/or harvested (steps 116, 120) according to various aspects of the disclosure. More specifically, in step 120 the plants may be uprooted and their roots trimmed by the processes disclosed herein in step 122. Additionally, or alternatively, plant tops may be cut at desired trim-length and the foliage harvested for use or disposal in step 124. Step 128 particularly shows that if a specific application is desired (e.g., animal feedstock, animal medicament, consumable use), various processes can occur. For instance, if intended for transplantation and propagation, the stalks can be separated into shoots in step 130. The stalks or shoots can also be placed into holding containers such as a plastic bag (with moisture therein) for shipping or into segmented pallets for use in the automated planting device of the disclosure as indicated in step 132. In step 134, the automated plantation devices will create holes in soil via a directional "punch", although a loose or more relaxed hole or indentation may be formed from a wheel, auger or the like. If the receiving soil has been plowed or scarified, the row may be "pre-compacted" before the "punch". The shoot is then planted, possibly to include initial fertilization based on soil type and conditions, and the holes are compressed around the plants.

FIG. 3 further shows that, depending on the application chosen in step 128, special baling techniques may be employed in step 136. Specifically, the method of cutting or mulching, the type of baler, the desired size, process, compaction, and handling of the grass crop before it reaches the baler will be determined. For instance, a specific hammer mill process may be selected in step 136 before preparing anti-parasitical medicine for livestock from the Vetiver Grass.

Figure 4:
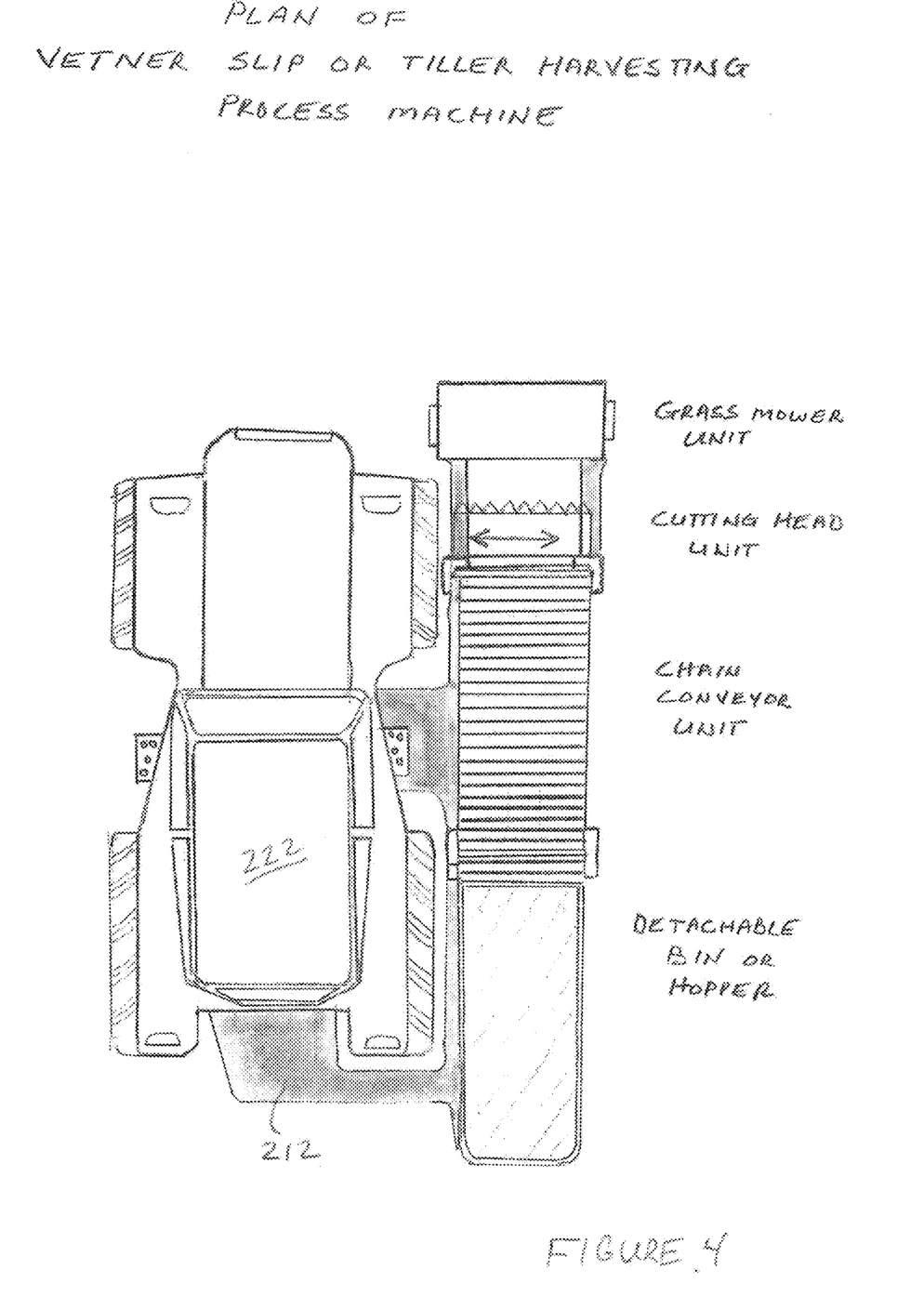
FIG. 4 is a plan view of a Vetiver Grass harvester in accordance with a further aspect of the disclosure.
Figure 5:
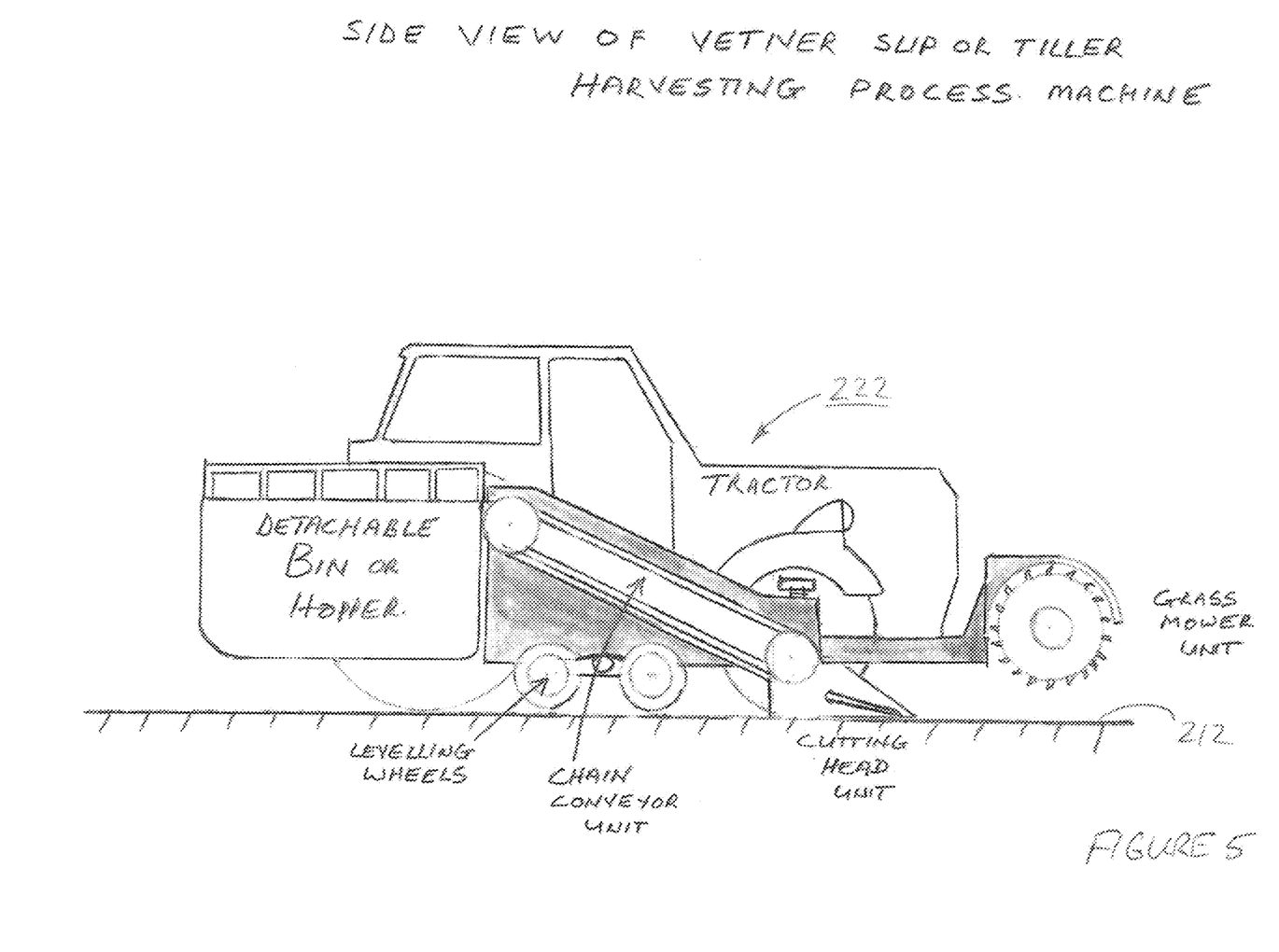
FIG. 5 is an elevational view the Vetiver Grass harvester as in FIG. 4.

Turning now to FIGS. 4 and 5, a harvester or harvesting machine 222 is shown for harvesting and baling of Vetiver crops 212 for a biomass source. The harvester 222 is used in a 3-stage process as follows:
1. harvesting & baling of the vetiver biomass 212;
2. harvesting the crown of the vetiver plant, which includes a portion of the stem and root system, into bare root slips and processing the vetiver plant into slips or tillers;
3. mechanically planting the processed vetiver slips or tillers using a semiautomatic or automatic planter attached to a tractor or ones that are self-propelled.

More particularly, FIGS. 4 and 5 show: Stage One (Vetiver biomass harvesting process) wherein crops are harvested for a biomass source by mechanical mowing (cutting down) & baling the leaf-stalk portion of the vetiver plant (clump) leaving approximately 3 inches behind. This process is carried out using baling equipment capable of simultaneously processing the vetiver crop and the subsequent baling process in round or square bales of varying mass. The baled matter is then transported to either ethanol or zylan processing plants. The mower unit will be hydraulically driven and can be detachable.

Stage Two (Vetiver slip or tillers harvesting process) systematically and in one continuous mechanical or hydraulic process, trimming and evenly mowing the remaining or leftover vetiver plant by cropping the foliage top, removing and uprooting the vetiver clump from the soil at a depth of 6 to 8 inches and transferring it via a moving chain conveyor into a detachable and portable holding bin or hopper for separation into individual slips-tillers and stacking into planting trays. The cutting unit uprooting the slips or tillers will connect to an eccentric which will move the cutting blade in either a sideways or a forward motion. The cutting head drive will be interlinked to the chain conveyor drive and controlled hydraulically. Various ride height adjusters will be installed to compensate for uneven ground as shown in FIGS. 4 and 5.

Finally, in Stage Three (Vetiver mechanical planting process) planting vetiver slips or tillers from planting trays is achieved using a modified mechanical onion-type planter attached to a tractor invented for this unique process. The prepared vetiver slips or tillers are placed into trays and fitted to either a semi-automatic or an automatic modified "Pandharinath More"-type onion planter machine. The planter is used for large scale planting operations for biomass crops in either fertile or marginal type soils.

Without limiting the scope of the present disclosure, potential specific embodiments of the present subject matter in a utility patent application may include:
1. A method for implementing an ecologically sustainable, economically practical Vetiver plantation for multiple applications of Vetiver crops, the method comprising:
   selecting a geographic area based on one of mitigation need, estimated crop yield, and multiple applications based on estimated crop yield;
   efficient transplantation of Vetiver grass to the geographic area to yield a Vetiver grass crop;
   providing a first benefit from a first application of mitigating water run-off or soil erosion with the Vetiver grass; and
   harvesting portions of the Vetiver grass crop to provide a second benefit selected from the second application group consisting of an animal medicament, a consumable, a biofuel and combinations thereof.
2. The method as in claim 1, wherein tops of Vetiver grass are trimmed.
3. The method as in claim 1, wherein roots of Vetiver grass are trimmed.
4. The method as in claim 1, wherein stalks of Vetiver grass are separated into shoots.
5. The method as in claim 4, wherein the stalks or the shoots are placed into containers for shipping or into segmented pallets for planting.
6. The method as in claim 4, further comprising forming holes in soil for the shoots.
7. The method as in claim 6, wherein the holes are formed from a punch, a wheel, an auger and combinations thereof.
8. The method as in claim 1, further comprising automatically cutting stems from between roots and leaves of the Vetiver grass.
9. The method as in claim 1, further comprising mechanically planting shoots.
10. The method as in claim 9, further comprising automatically compressing soil around the shoot.
11. The method as in claim 9, further comprising automatically fertilizing the shoot.
12. A method for efficiently implementing, sustaining, and propagating Vetiver grass plantations for multiple applications, the method comprising:
   selecting a planting area based on predetermined criteria;
   transplanting Vetiver shoots to the planting area to yield a Vetiver grass crop;
   providing a primary application of the Vetiver grass crop; and
   providing a secondary application of the Vetiver grass crop subsidized by the primary application.
13. The method as in claim 12, wherein the criteria are selected from the group consisting of mitigation need, water purification need, estimated crop yield, and potential multiple applications based on the estimated crop yield.
14. The method as in claim 12, wherein the primary application is one of mitigating water run-off, water purification, or prevention of soil erosion.
15. The method as in claim 12, wherein the secondary application is selected from the group consisting of an animal medicament, a consumable, a biofuel and combinations thereof
16. An ecologically sustainable, economically practical, cold tolerant Vetiver grass plant substantially as described and illustrated in the specification herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:
1. A method for implementing transplantation of a Vetiver plant, the method comprising:
   harvesting and baling a leaf-stalk portion of a Vetiver Plant;
   uprooting a Vetiver clump portion of the vetiver plant mechanically;
   separating the Vetiver clump portion into individual slips or tillers;
   planting the slips or tillers in a selected geographic area.
2. The method of claim 1, wherein the slips or tillers are planted mechanically using an onion planter machine.
3. The method of claim 1, wherein the Vetiver clump is mechanically and automatically uprooted from soil at a depth of about six to eight inches.
4. The method of claim 1, wherein at least one two of the steps of harvesting, uprooting, separating and planting occur via a mechanical process.
5. The method of claim 1, further comprising trimming tops of the Vetiver Plant prior to uprooting the Vetiver clump portion.
6. The method of claim 1, further comprising trimming roots of the Vetiver Plant.
7. The method of claim 1, further comprising separating stalks of the Vetiver clump portion into shoots.

8. The method of claim 7, further comprising placing the stalks or the shoots into containers for shipping or into segmented pallets for planting.

9. The method of claim 7, further comprising forming holes in soil for the shoots.

10. The method of claim 9, wherein the holes are formed from a punch, a wheel, an auger and combinations thereof.

11. The method of claim 7, further comprising compressing soil around the shoots.

12. The method of claim 7, further comprising fertilizing the shoots.

13. The method of claim 1, further comprising cutting stems from between roots and leaves of the Vetiver grass clump.

14. The method of claim 1, wherein the Vetiver Plant is genetically modified Vetiver grass plant that is tolerant to cold temperatures.

\* \* \* \* \*